United States Patent
Schulze et al.

(10) Patent No.: US 11,162,364 B2
(45) Date of Patent: Nov. 2, 2021

(54) REPAIR OF MONOCRYSTALLINE FLOW CHANNEL SEGMENTS BY MONOCRYSTALLINE REMELTING

(71) Applicant: MTU Aero Engines AG, Munich (DE)

(72) Inventors: Uwe Schulze, Winsen (DE); Knut Partes, Verden (DE)

(73) Assignee: MTU AERO ENGINES AG, Munich (DE)

( * ) Notice: Subject to any disclaimer, the term of this patent is extended or adjusted under 35 U.S.C. 154(b) by 156 days.

(21) Appl. No.: 15/099,348

(22) Filed: Apr. 14, 2016

(65) Prior Publication Data
US 2016/0312613 A1 Oct. 27, 2016

(30) Foreign Application Priority Data
Apr. 21, 2015 (DE) .......................... 102015207212.6

(51) Int. Cl.
*F01D 5/00* (2006.01)
*B23K 26/08* (2014.01)
(Continued)

(52) U.S. Cl.
CPC .............. *F01D 5/005* (2013.01); *B23K 26/08* (2013.01); *B23K 26/354* (2015.10); *B23P 6/002* (2013.01); *F01D 5/14* (2013.01); *F01D 5/147* (2013.01); *B23K 2101/001* (2018.08); *F05D 2230/13* (2013.01); *F05D 2230/237* (2013.01); *F05D 2230/238* (2013.01); *F05D 2300/701* (2013.01); *Y02T 50/60* (2013.01)

(58) Field of Classification Search
CPC . F01D 5/005; F01D 5/14; F01D 5/147; B23K 26/354; B23K 26/08; B23K 26/0081; B23P 6/002
See application file for complete search history.

(56) References Cited

U.S. PATENT DOCUMENTS 6,464,128 B1 10/2002 Messeling et al.
7,169,242 B2 1/2007 Fernihough et al.
(Continued)

FOREIGN PATENT DOCUMENTS

DE 10005874 B4 8/2001
DE 102005021642 A1 11/2006
(Continued)

*Primary Examiner* — Moshe Wilensky
(74) *Attorney, Agent, or Firm* — Abel Schillinger, LLP

(57) ABSTRACT

The invention relates to a method for repairing flow channel segments of a turbomachine. The method comprises providing a monocrystalline or directionally solidified flow channel segment whose length and width extend along the flow channel, each being greater than the thickness thereof, and whose width and length delimit a surface which constitutes a bounding surface of a flow channel and has damage, cleaning the bounding surface to remove impurities, remelting at least a part of the bounding surface in a surface region so that melted material solidifies epitaxially in an inner region facing toward the unmelted material and forms a structural region in which the monocrystalline or directionally solidified structure is preserved, and that melted material solidifies in a polycrystalline fashion in an outer region which faces toward the flow channel and forms an edge region, and removing the edge region.

19 Claims, 3 Drawing Sheets

(51) Int. Cl.
*B23P 6/00* (2006.01)
*F01D 5/14* (2006.01)
*B23K 26/354* (2014.01)
*B23K 101/00* (2006.01)

(56) References Cited

U.S. PATENT DOCUMENTS

| | | |
|---|---|---|
| 7,586,061 B2 | 9/2009 | Hoebel et al. |
| 8,426,765 B2 | 4/2013 | Arjakine et al. |
| 2005/0040147 A1 | 2/2005 | Hoebel et al. |
| 2005/0067065 A1 | 3/2005 | Fernihough et al. |
| 2006/0248718 A1 | 11/2006 | Szela et al. |
| 2009/0134133 A1 | 5/2009 | Mokadem |
| 2009/0175727 A1 | 7/2009 | Bischof et al. |
| 2009/0252987 A1 | 10/2009 | Greene, Jr. |
| 2010/0206855 A1 | 8/2010 | Mokadem |
| 2010/0237049 A1 | 9/2010 | Mokadem |
| 2010/0313405 A1 | 12/2010 | Mohyi Hapipi et al. |
| 2011/0020127 A1 | 1/2011 | Burbaum et al. |
| 2011/0089150 A1 | 4/2011 | Arjakine et al. |
| 2014/0197143 A1 | 7/2014 | Burbaum et al. |
| 2014/0339206 A1 | 11/2014 | Ott et al. |
| 2015/0226070 A1* | 8/2015 | Plante .............. F01D 5/225 416/212 A |
| 2015/0343563 A1 | 12/2015 | Burbaum |
| 2015/0360256 A1 | 12/2015 | Burbaum et al. |
| 2015/0367445 A1 | 12/2015 | Burbaum et al. |

FOREIGN PATENT DOCUMENTS

| | | |
|---|---|---|
| DE | 60312826 T2 | 1/2008 |
| DE | 60130722 T2 | 6/2008 |
| DE | 102009049518 A1 | 4/2011 |
| EP | 0892090 A1 | 1/1999 |
| EP | 1340567 A1 | 9/2003 |
| EP | 1721697 A1 | 11/2006 |
| EP | 2047940 A1 | 4/2009 |
| EP | 2107370 A2 | 10/2009 |
| EP | 2266743 A2 | 12/2010 |
| EP | 2591877 A1 | 5/2013 |
| EP | 2762260 A1 | 6/2014 |
| EP | 2754530 A1 | 7/2014 |
| EP | 2756915 A1 | 7/2014 |
| EP | 2762262 A1 | 8/2014 |
| EP | 2783789 A1 | 10/2014 |
| WO | 2009046735 A1 | 4/2009 |
| WO | 2009047024 A1 | 4/2009 |
| WO | 2013068161 A1 | 5/2013 |
| WO | 2014111225 A1 | 7/2014 |
| WO | 2014111296 A1 | 7/2014 |
| WO | 2014114581 A1 | 7/2014 |

* cited by examiner

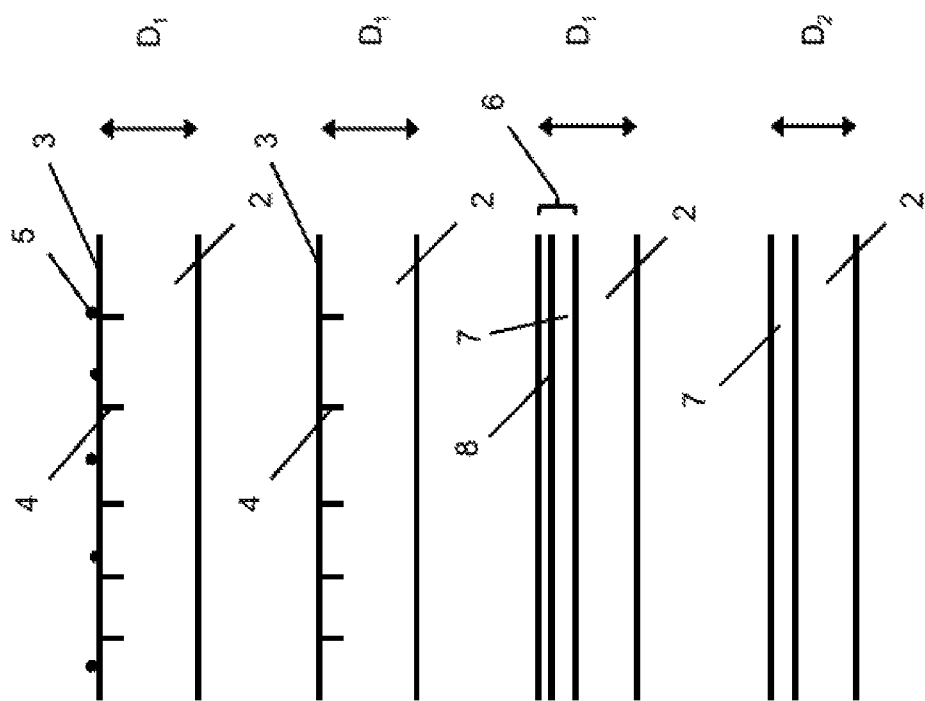

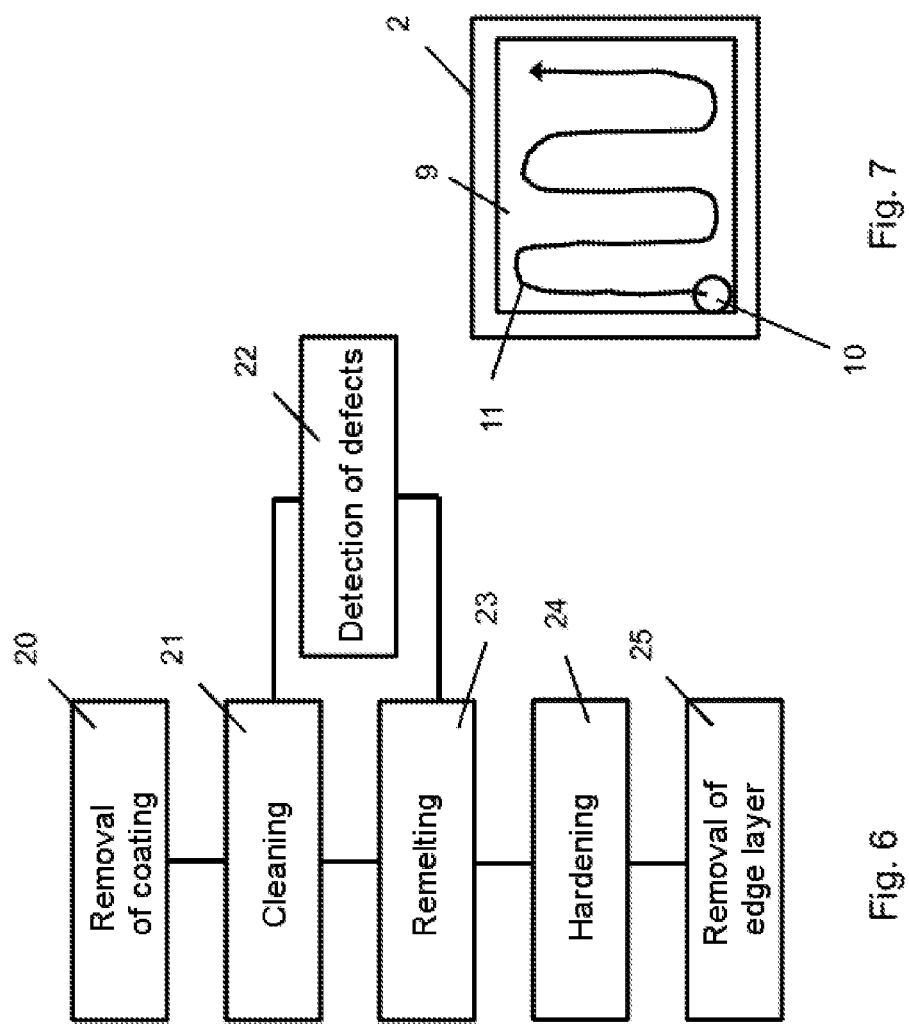

REPAIR OF MONOCRYSTALLINE FLOW CHANNEL SEGMENTS BY MONOCRYSTALLINE REMELTING

CROSS-REFERENCE TO RELATED APPLICATIONS

The present application claims priority under 35 U.S.C. § 119 of German Patent Application No. 102015207212.6, filed Apr. 21, 2015, the entire disclosure of which is expressly incorporated by reference herein.

BACKGROUND OF THE INVENTION

1. Field of the Invention

The present invention relates to a method for repairing flow channel segments of turbomachines, and in particular of aircraft engines.

2. Discussion of Background Information

In turbomachines, and in particular aircraft engines, monocrystalline or directionally solidified components are used for various components in the thermally loaded regions, these components having a higher strength, and in particular improved high-temperature stability, because of the monocrystalline structure or the directionally solidified structure, so that the components can be dimensioned correspondingly smaller, which leads to a saving on material and weight, and/or the turbomachines can be operated at higher temperatures, which contributes to an increase in efficiency.

However, monocrystalline components are very expensive to produce, so that attempts must be made to achieve a lifetime which is as long as possible, although this is difficult to do with the relevant operating conditions with high temperatures, high mechanical stresses, aggressive media, thermal cycling and the like. Accordingly, damage due to cracking or the like often occurs in such components, so that the components need to be replaced or repaired. For certain components, such as turbine blades or other castings, repair methods which make it possible to remove casting defects or damage incurred during operation have therefore already been developed.

In this context, it is known to remelt monocrystalline or directionally solidified components in a monocrystalline fashion. This means that the damaged region is melted and epitaxially solidified in a way corresponding to the monocrystalline or directionally solidified structure of the component. Examples of this are described in EP 2 047 940 A1, EP 1 340 567 A1, WO 2009/047024 A1 and WO 2009/046735 A1, the entire disclosures of which are incorporated by reference herein. Monocrystalline remelting per se is described by the dissertation of B. Burbaum "Verfahrenstechnische Grundlagen für das Laserstrahl-Umschmelzen einkristalliner Nickelbasis-Superlegierungen" [Process-technological fundamentals for laser-beam remelting of monocrystalline nickel-based superalloys], Dissertation at RWTH Aachen, 2010, the entire disclosure of which is incorporated by reference herein.

However, the repair methods described therein for monocrystalline components relate to structural components such as turbine blades which only need to be repaired in a narrowly restricted region.

In turbomachines such as aircraft engines, however, there are other components which are likewise configured in a monocrystalline fashion, for example flow channel segments, in particular sealing segments, so-called shrouds, which are arranged around the flow channel and bound the latter. Corresponding sealing segments may additionally have sealing surfaces on which the blade tips of the rotating turbine blades exert friction.

Such flow channel segments are likewise exposed to high loads due to high and alternating temperatures, as well as corresponding mechanical stresses due to high pressurization and cyclic pressurization. Damage, for example surface cracks or the like, which may lead to total failure of the component, correspondingly also occurs in these components. In order to avoid this, the flow channel segments are periodically inspected and refurbished.

If, for example, surface cracks are detected during an inspection, these surface cracks are usually removed by erosion of the affected surface layer in order to avoid crack propagation. So long as a correspondingly processed flow channel segment does not fall below a minimum component thickness, it can be reused, while otherwise the flow channel segments have to be replaced. This, particularly in the case of flow channel segments configured in a monocrystalline fashion, entails a high maintenance outlay.

In view of the foregoing, it would be advantageous to have available a method for repairing monocrystalline or directionally solidified flow channel segments of turbomachines, and in particular aircraft engines, which reduces the maintenance outlay and the operating costs of corresponding turbomachines by extending the lifetime of monocrystalline or directionally solidified flow channel segments. In this case, the corresponding method should be simple and efficient to carry out, and the repaired flow channel segments should have the required property profile in a manner which is as unrestricted as possible.

SUMMARY OF THE INVENTION

The present invention provides a method for repairing flow channel segments of a turbomachine, in particular of an aircraft engine. The method comprises:

(a) providing a monocrystalline or directionally solidified flow channel segment, which has a length, a width and a thickness, the length and width extending along the flow channel and each being greater than the thickness, and the width and length delimiting a surface which constitutes a bounding surface of a flow channel and has damage due to operation, (b) cleaning the bounding surface to remove impurities therefrom, (c) remelting at least a part of the bounding surface in a surface region in such a way that melted material solidifies epitaxially in an inner region facing toward the unmelted material and forms a structural region in which the monocrystalline or directionally solidified structure is preserved, and that melted material solidifies in a polycrystalline fashion in an outer region which faces toward the flow channel and forms an edge region, (d) removing the edge region.

In one aspect of the method, a heat treatment of the flow channel segment may be carried out to adjust the lattice structure between (c) and (d).

In another aspect, the method may comprise an inspection operation for detecting the damage. For example, a dye penetrant test may carried out in the inspection operation.

In yet another aspect of the method, the cleaning of the surface may comprise thermal cleaning, mechanical cleaning, chemical cleaning, flushing with a liquid or a gas flow, fluoride ion cleaning and combinations of two or more thereof.

In a still further aspect of the method, the majority of the bounding surface, e.g., more than 60% of the bounding surface, more than 75% of the bounding surface, or more than 90% of the bounding surface may be remelted.

In another aspect of the method of the present invention, the remelting may be carried out with a high-energy beam, e.g., a laser beam, which is moved with its beam spot, which strikes the part to be melted of the bounding surface, relative to the bounding surface part to be melted, a beam spot movement pattern thereby generated comprising a continuous meandering movement, a repeated parallel linear movement in the same direction or in opposite directions, in particular alternately in opposite directions, or a spiral movement.

In another aspect of the method, the melted surface region may extend in the direction of the thickness of the flow channel segment over not more than 20% of the thickness of the flow channel segment, e.g., not more than 10%, or not more than 5% of the thickness of the flow channel segment and/or over at least 1% of the thickness of the flow channel segment, e.g., at least 5%, or at least 10% of the thickness of the flow channel segment.

In yet another aspect, the edge region may extend in the thickness direction over from 1% to 20% of the melted surface region, e.g., from 5% to 10% of the melted surface region.

In another aspect of the method, the edge region may be removed mechanically and/or chemically.

In a still further aspect, a coating on the bounding surface may be removed from the flow channel segment before the provision or before or during the cleaning.

In another aspect of the method, a minimum thickness of the flow channel segment may be determined, the repair being carried out, in particular several times over the lifetime of the flow channel segment, until the thickness of the flow channel segment after removal of the edge region falls below the minimum thickness.

In order to repair flow channel segments, the present invention proposes the use of monocrystalline remelting also on extensive components such as the flow channel segments, and to remelt sizeable parts of the surfaces of the flow channel segments. It has surprisingly been shown that monocrystalline remelting is also possible for the repair of sizeable areas on thin-walled components in such a way that, after the remelting, defects such as cracks are removed and the remelted component again has a uniform structure of monocrystalline or directionally solidified material, so that the property profile of the monocrystalline or directionally solidified component is furthermore ensured in full scope.

In detail, the method according to the invention for repairing flow channel segments of a turbomachine, and in particular of an aircraft engine, therefore comprises the steps of providing a monocrystalline or directionally solidified flow channel segment, cleaning the surface to be reprocessed, namely in particular the bounding surface of the flow channel, remelting of at least a part of this bounding surface in a surface region, and removal of an edge region on the surface of the remelted flow channel segment, which is solidified in a polycrystalline fashion.

Between the remelting and the removal of the edge region, a heat treatment of the flow channel segment may be carried out in order to adjust the lattice structure.

It is characteristic of the flow channel segments intended for the repair that they have a very much longer length and width in comparison with the thickness, and therefore constitute an extensive component which is susceptible to distortion during remelting. In particular, the thickness may be only a fraction of the length or width of the flow channel segment, in which case the ratio of thickness to length or width may for example lie in the range of from 1/10 to 1/30.

The flow channel segment provided may have impurities, including deposited oxides, which should be removed before the remelting in order to avoid introduction of the impurity or oxides into the remelted material.

The cleaning of the surface may be carried out in various ways, which may also be combined with one another. For example, the methods for cleaning the surface may include thermal cleaning, mechanical cleaning, chemical cleaning, flushing with liquid and/or with a gas flow, and cleaning in particular atmospheres, for example fluoride ion cleaning, as well as corresponding combinations thereof. In particular, the cleaning may be carried out in such a way that oxides present on the surface, and in particular on crack edges, are removed.

The monocrystalline remelting, during which the melted material is subsequently reformed epitaxially in a monocrystalline or directionally solidified fashion on the unmelted material, may be carried out by means of a high-energy beam, for example a laser, which is moved relative to the part to be melted of the surface to be melted. The relative movement between the surface to be melted and the high-energy beam may be carried out in the form of a movement pattern which, for example, may comprise a continuous meandering movement, a repeated movement, in particular a repeated parallel linear movement in the same direction or in opposite directions, or a spiral movement.

With the method according to the invention, large areas of the flow channel segment can in particular be repaired, and especially the bounding surface which is formed in the direction of the flow channel, i.e. which comes into contact with the flow fluid. In particular, the majority, i.e. greater than or equal to 50% of the bounding surface of a flow channel segment, in particular more than 60% of the bounding surface, more than 75%, or more than 90% of the bounding surface of the flow channel segment may be remelted.

The remelting may be carried out in a surface region as far as a defined depth, i.e. a particular dimension in the thickness direction of the flow channel segment, in which there is damage, for example cracks.

The melted surface region may extend in the direction of the thickness of the flow channel segment over less than or equal to 20% of the thickness of the flow channel segment, in particular less than or equal to 10%, or less than or equal to 5% of the thickness of the flow channel segment, in which case at least a melted surface region of the order of 1% of the thickness of the flow channel segment, in particular at least 5%, or at least 10% of the thickness of the flow channel segment may be melted.

During the monocrystalline remelting, only a part of the melted surface region in the thickness direction is solidified in a monocrystalline or directional fashion, while an outer surface region is solidified in a polycrystalline fashion. Such an outer surface region, which is referred to as an edge region, may extend in the thickness direction over from 1% to 20% of the melted surface region, in particular from 5% to 10% of the melted surface region. The edge region is removed following a heat treatment of the flow channel segment, in order to adjust the lattice structure, carried out after the remelting, so that after removal of the edge region the flow channel segment is preferably configured exclusively in a monocrystalline or directionally solidified fashion in the thickness direction.

The removal of the edge region may be carried out mechanically and/or chemically, including electrochemical processing.

In the method according to the invention, a coating possibly present on the flow channel segment, for example a run-in coating or a thermal insulation layer, may be removed before the remelting, and in particular before the cleaning, in which case the removal may likewise be carried out by mechanical and/or chemical treatment.

After the cleaning of the flow channel segment, it may be inspected for damage in order to establish where damage to be removed is present, so that the damaged regions can then be repaired in a targeted manner. All suitable methods may be used for the inspection, dye penetrant inspection in particular having proven suitable since cracks can thereby be made visible.

With the method according to the invention, the lifetime of flow channel segments can be increased significantly since only a small material loss takes place due to the removal of the edge region, which represents a very much lower material loss in comparison with the previous methods in the prior art, in which the damaged region is removed completely. In this way, the repair method according to the invention can also be carried out repeatedly on a flow channel segment during its entire lifetime, and the lifetime can be increased significantly overall. In particular, for flow channel segments which have a certain thickness region for the repair of damage, repair can be carried out very much more frequently. The repair according to the invention may be carried out repeatedly so long as the thickness of the flow channel segment after removal of the edge region does not fall below a minimum thickness.

BRIEF DESCRIPTION OF THE DRAWINGS

In the appended drawings, purely schematically,

FIG. 2 shows a partial cross section through the flow channel segment of FIG. 1 after a certain time during operation, FIG. 3 shows a partial cross section of the flow channel segment of FIG. 2 after the cleaning step, FIG. 4 shows a partial cross section of the flow channel segment of FIG. 2 and FIG. 3 after the remelting, FIG. 5 shows a partial cross section of the flow channel segment of FIG. 2 to FIG. 4 after removal of the edge region, FIG. 6 shows a flowchart of a repair method according to the present invention, and FIG. 7 shows a plan view of a flow channel segment with representation of a part of the bounding surface to be repaired of the flow channel segment, with the movement path of the laser beam being indicated.

DETAILED DESCRIPTION OF EMBODIMENTS OF THE INVENTION

Figure 1:
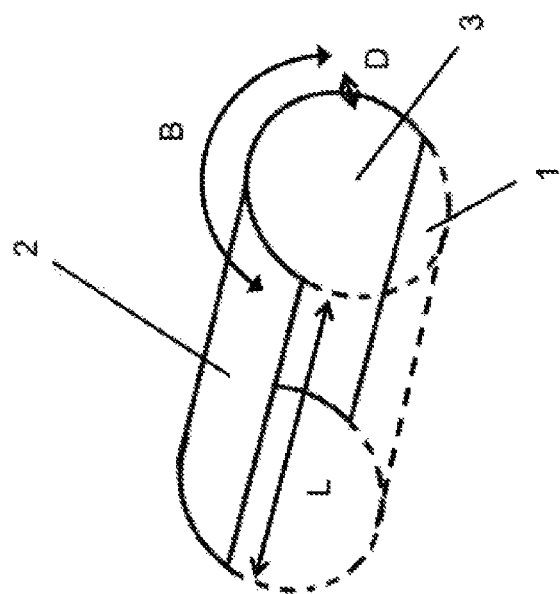
FIG. 1 shows a perspective representation of a flow channel segment as part of a flow channel.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

FIG. 1 shows purely schematically a perspective representation of a flow channel segment 2. The flow channel segment 2 partially encloses a flow channel 1, the rest of which is shown in a dashed representation. A plurality of flow channel segments 2 may fully enclose the flow channel 1. In the representation shown, the flow channel segment 2 is represented as a segment of a lateral surface of a cylinder, this being merely a schematic representation. Corresponding flow channel segments 2 may be configured in any desired shape, the basic structure with a large length L and a large width B compared with a small thickness D generally being applicable for a very wide variety of flow channel segments 2. The thickness D may for example lie in the range of a few millimeters, while the length L and the width B may vary in the range of from a few centimeters to a few meters.

FIG. 2 shows a partial cross section through the flow channel segment 2 so that the thickness dimension D, here indicated by $D_1$, is clear.

Cracks, which extend from the surface into the interior of the material, are formed on the flow channel segment 2, or on the bounding surface 3 which delimits the flow channel, as a result of operation and the associated high thermal loads and mechanical stresses. FIG. 2 additionally represents that the bounding surface 3 may be contaminated with impurities 5.

According to the repair method according to the invention, the flow channel segment 2, and in particular the bounding surface 3, is subjected to cleaning during which the impurities 5 are removed. The cleaning may for example be carried out by fluoride ion annealing, during which the flow channel segment 2 is annealed in a fluoride ion atmosphere at a particular temperature so that the fluorine gas contained can react with oxides deposited on the bounding surface 3, the reaction products being evaporated and cleaning of the bounding surface 5 thus being carried out.

FIG. 4 shows a partial cross section through the flow channel segment 2 of FIG. 2 and FIG. 3 after the remelting of a surface region 6 of the flow channel segment 2.

The remelting may for example be carried out using a laser beam, the material being melted to a particular depth by the beam energy and then cooled in such a way that epitaxial growth of the material takes place on the monocrystalline or directionally solidified basic material of the flow channel segment 2. The thickness of the flow channel segment 2 after the remelting is still $D_1$, since no significant material loss has yet occurred. However, the cracks 4 have been removed by the melting of the surface region 6.

Nevertheless, the epitaxial growth with monocrystalline or directional solidification does not take place over the entire thickness $D_1$ of the melted surface region 6, but only over a part thereof, namely in the so-called structural region 7 which adjoins the unmelted material of the flow channel segment 2. On the outer side, the solidification conditions cannot be maintained in such a way that epitaxial and therefore monocrystalline or directional solidification is likewise possible, so that a polycrystalline edge region 8 which extends over the outer part of the melted surface region 6 is formed.

FIG. 5 shows in a partial cross section the flow channel segment 2 after removal of the edge region 8. In order to achieve a continuous monocrystalline or directionally solidified structure of the flow channel segment 2 in the thickness direction, the polycrystalline edge region 8 is removed by means of mechanical processing, for example grinding or the like, or chemical processing, for example corresponding etching, so that only the monocrystalline or directionally solidified structural region 7 of the melted surface region 6 then remains.

FIG. 6 shows in a flowchart the various method steps of one embodiment of the method according to the invention, which lead to the various stages of the flow channel segment 2 which have been represented in FIG. 2 to FIG. 5. However, the flowchart of FIG. 6 mentions a further step which has not been represented in FIG. 2 to FIG. 5, namely the removal of a coating possibly provided on the flow channel segment 2 or the bounding surface 3, for example a thermal insulation layer or a running-in coating or the like. Such a coating may be removed before or during the cleaning (step 20), likewise in a mechanical and/or chemical way, i.e. for example by grinding, polishing and/or etching. After the removal of a possible coating, the cleaning step 21 for removing impurities may then be carried out.

After the cleaning step 21, the remelting 23 may be carried out immediately or an intermediate step 22 for detecting or recording the damage to the bounding surface 3 may be carried out. If almost the entire bounding surface 3 is remelted, the detection step 22 may be omitted. If only particular regions of the bounding surface 3 are repaired, however, then by means of the detection step 22 the parts of the bounding surface 3 in which remelting is necessary may be established.

The remelting step 23 is followed by a heat treatment step 24, in which the entire flow channel segment is subjected to a heat treatment by means of which the lattice structure of the flow channel segment is adjusted in the desired way in order to eliminate the effects of the remelting. The heat treatment is, naturally, carried out below the melting temperature in order to avoid destruction of the monocrystalline structure or directionally solidified structure.

After the heat treatment, the edge region 8 is removed in the removal step 25 so that there is subsequently a flow channel segment which has a monocrystalline or directionally solidified structure over the entire thickness.

FIG. 7 shows in a plan view a part of a flow channel segment 2 with a processing region 9 which is intended to be repaired by remelting. The remelting is carried out by means of a laser beam, the incidence spot 10 of which on the remelting region 9 is likewise represented in FIG. 7. The incidence spot 10 of the laser beam is moved according to the movement path 11 relative to the surface of the flow channel segment 2 so that the entire processing region 9 of the bounding surface of the flow channel segment which is intended to be melted is scanned by the incidence spot 10 of the laser beam. The exemplary embodiment of FIG. 7 shows a meandering movement path 11 in which the incidence spot 10 is guided continuously over the entire processing region 9. It is, however, also possible to guide the laser beam in a different way, for example by repeated parallel linear guiding of the beam, or the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for repairing a damaged flow channel segment of a turbomachine to extend a lifetime of the flow channel segment, wherein the method comprises:
    (a) providing a damaged monocrystalline or directionally solidified flow channel segment, which has a length, a width and a thickness, the length and width extending along the flow channel and each being greater than the thickness, and the width and length delimiting a surface which constitutes a bounding surface of a flow channel segment and shows damage caused by service of the flow channel segment in a turbomachine,
    (b) cleaning the bounding surface to remove impurities therefrom,
    (c) remelting at least a damaged part of the bounding surface of the flow channel segment which shows damage caused by service of the flow channel segment in a turbomachine in a surface region in such a way that melted material solidifies epitaxially in an inner region facing toward unmelted material and forms a structural region in which a monocrystalline or directionally solidified structure is preserved, and that melted material solidifies in a polycrystalline fashion in an outer region which faces toward the flow channel and forms an edge region, and
    (d) removing the edge region;
    to provide a repaired flow channel segment whose thickness at a repaired bounding surface is smaller than an original thickness at the repaired bounding surface, the damaged flow channel segment being a flow channel segment which has been repaired by carrying out (a) to (d) at least once before to provide a repaired flow channel segment whose thickness at a repaired bounding surface is further reduced.

2. The method of claim 1, wherein a heat treatment of the flow channel segment is carried out between (c) and (d) to adjust the lattice structure.

3. The method of claim 1, wherein the cleaning of the surface comprises a method selected from thermal cleaning, mechanical cleaning, chemical cleaning, flushing with a liquid or a gas flow, fluoride ion cleaning and combinations of two or more thereof.

4. The method of claim 1, wherein at least 50% of the bounding surface is remelted.

5. The method of claim 4, wherein more than 60% of the bounding surface is remelted.

6. The method of claim 4, wherein more than 90% of the bounding surface is remelted.

7. The method of claim 1, wherein a melted surface region extends in a direction of the thickness of the flow channel segment over less than or equal to 20% of a thickness of the flow channel segment.

8. The method of claim 1, wherein a melted surface region extends in a direction of a thickness of the flow channel segment over at least 5% of the thickness of the flow channel segment.

9. The method of claim 1, wherein the edge region extends in a thickness direction over from 1% to 20% of a melted surface region.

10. The method of claim 1, wherein the damage comprises a surface crack.

11. The method of claim 1, wherein a ratio of thickness to length and/or a ratio of thickness to width of the flow channel segment ranges from 1/10 to 1/30.

12. The method of claim 4, wherein more than 75% of the bounding surface is remelted.

13. The method of claim 4, wherein more than 90% of the bounding surface is remelted.

14. The method of claim 4, wherein substantially the entire bounding surface is remelted.

15. A method for repairing a damaged shroud segment of a turbomachine to extend a lifetime of the shroud segment, wherein the method comprises:
   (a) providing a damaged monocrystalline or directionally solidified shroud segment, which has a length, a width and a thickness, the length and width extending along a flow channel and each being greater by a factor of at least 10 than the thickness, and the width and length delimiting a surface which constitutes a bounding surface of the shroud segment and shows damage caused by service of the shroud segment in a turbomachine,
   (b) cleaning the bounding surface to remove impurities therefrom,
   (c) remelting at least a damaged part of the bounding surface of the shroud segment which shows damage caused by service of the shroud segment in a turbomachine in a surface region in such a way that melted material solidifies epitaxially in an inner region facing toward unmelted material and forms a structural region in which a monocrystalline or directionally solidified structure is preserved, and that melted material solidifies in a polycrystalline fashion in an outer region which faces toward the flow channel and forms an edge region, and
   (d) removing the edge region;
   to provide a repaired shroud segment whose thickness at a repaired bounding surface is smaller than an original thickness at the repaired bounding surface, the damaged shroud segment being a shroud segment which has been repaired by carrying out (a) to (d) at least once before to provide a repaired shroud segment whose thickness at a repaired bounding surface is further reduced.

16. The method of claim 15, wherein the damage comprises a surface crack.

17. The method of claim 15, wherein at least 50% of the bounding surface is remelted.

18. The method of claim 15, wherein at least 75% of the bounding surface is remelted.

19. The method of claim 15, wherein at least 90% of the bounding surface is remelted.

* * * * *